United States Patent Office 2,934,716
Patented Apr. 26, 1960

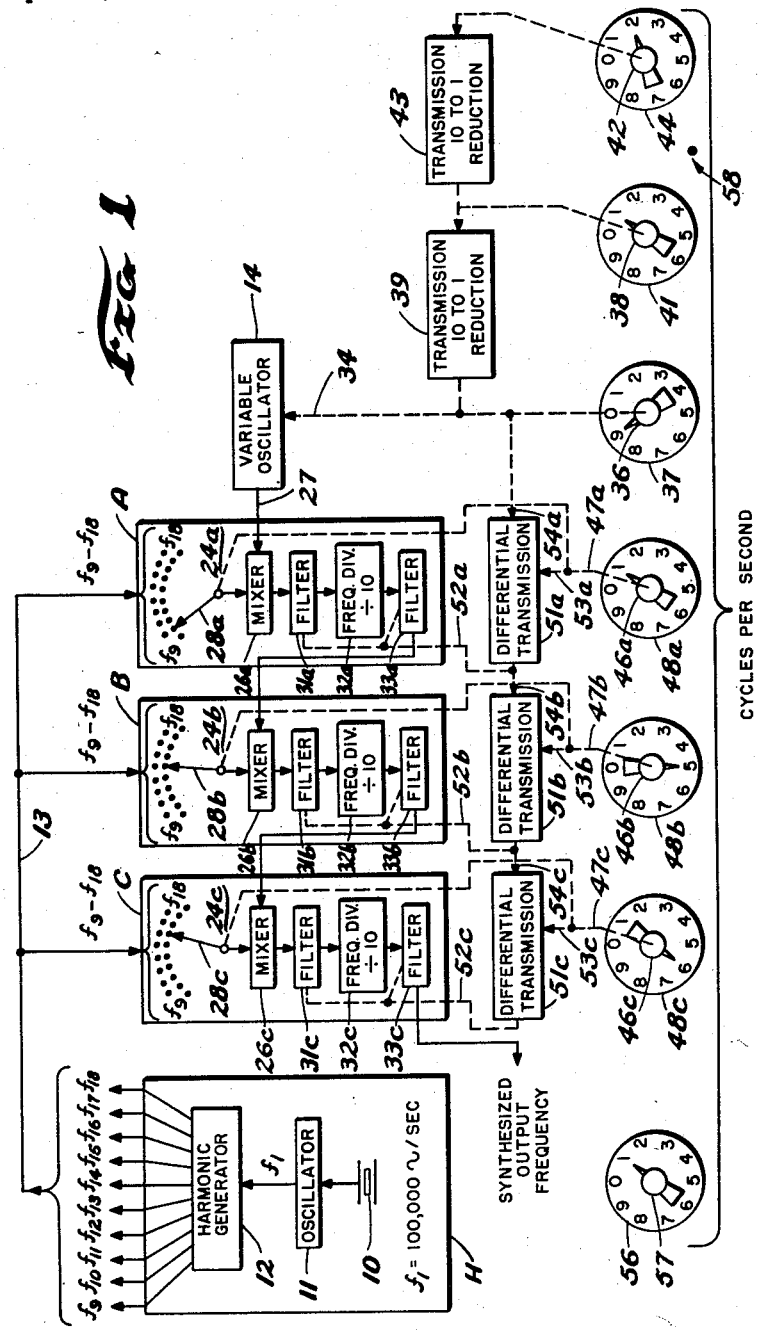

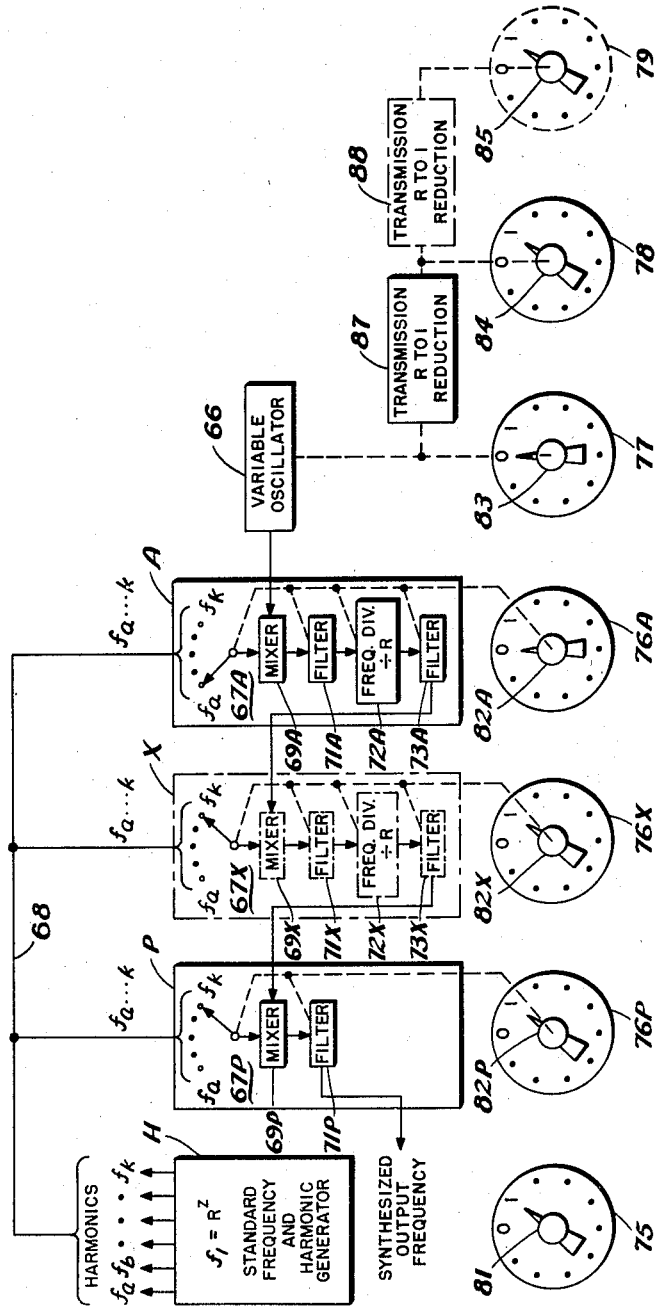

2,934,716

VARIABLE FREQUENCY SYNTHESIZER

John W. Smith, Cedar Rapids, Iowa, assignor to Collins Radio Company, Cedar Rapids, Iowa, a corporation of Iowa Application April 2, 1956, Serial No. 575,379

3 Claims. (Cl. 331—39)

This invention relates generally to a frequency synthesizing system which can obtain a direct digital indication of its output frequency, while maintaining great stability for its output frequency.

This invention is an improvement upon a previous invention described and claimed in Patent No. 2,829,255 titled "Digital Frequency Synthesizer System" by Victor W. Bolie assigned to the same assignee as the present invention. The prior invention teaches how the harmonic output of a stabilized fixed frequency source, such as a crystal, may be combined systematically to obtain a direct digital indication of any digitally related frequency within a required range, wherein the limiting factor of output-frequency resolution is the stability of its fixed frequency source.

The present invention provides a simplification in both structure and economy to the system of the prior synthesizer without necessarily affecting the stability of its output frequency, while at the same time maintaining the direct digital indication of the output frequency. Specifically, this invention teaches how a single variable oscillator may replace one or more digital units of the prior system without necessarily adversely affecting the operation of the synthesizer system.

The invention is not restricted to a particular numerical system and may use a number system having any radix, such as for example, the binary or ternary systems. Generally, a decade system is desired, because it is presently the most commonly known of the number systems, although basically not the simplest. The invention obtains a direct and exact digital relationship between its output frequency and its indicated frequency in whatever number system is chosen.

The invention utilizes two basic frequency sources. The first may be called the "standard frequency source" of the system. It is a fixed and highly stable frequency, such as may be obtained from a crystal oscillator. The second is a variable frequency oscillator; and its calibrated range is between two adjacent harmonics of the standard frequency. The standard frequency, of course, may be obtained from any of its multiples or divisibles, as for example, 100 kilocycles may be obtained from 2.5 megacycles by dividing it by 25.

In order to obtain digital calibration in any number system, the "standard frequency" must be an integer power of the radix of the chosen number system. For example, in the decade system, the standard frequency is an integer power of ten. On the other hand, in the binary system, the standard frequency should be an integer power of two.

It is conceivable, however, that where digital calibration is not required, the standard frequency may be arbitrary.

The output frequency range of the invention may vary between limits that may be widely spaced or narrowly spaced as desired. The limits may be defined by the following expression:

Output Frequency Range $= [R^z M$ to $R^z(M+1)] R^t$ (1)

Where R is the radix of the chosen number system; $R^z$ is the standard frequency of the system; and M is any integer, although preferably not zero; and $t$ is any positive or negative integer and includes zero. The standard frequency, M, and $t$ are chosen by design considerations according to the output frequency range and the frequency stability desired from a given embodiment of the invention.

Basically, this invention requires only a single set of harmonic frequencies, $f_a \ldots {}_k$, of the standard frequency. A harmonic is called herein by its multiple of the standard frequency. The bounding harmonics in a set will be within the following limits;

Lower Harmonic in the Set $= M(R-1)$ (2)

Upper Harmonic in the Set $= (M+1)(R-1)$ (3)

where the terms are as defined above. For example, if M is chosen to be one in the decade system, where R is ten, the set of harmonics, $f_a \ldots {}_k$, will range from the ninth through the eighteenth harmonics ($f_a = f_9$ through $f_k = f_{18}$).

The frequencies that occupy the output frequency range defined by Expression 1 may be stated generically by the following expression which was obtained by an analysis of the operation of the invention:

$$f_{out} = \left( \ldots (((Rf_a \ldots {}_k + f_a \ldots {}_k)R + f_a \ldots {}_k)R + f_a \ldots {}_k) \right.$$
$$\left. \left( R + f_a \ldots {}_k + \frac{1}{R}\left(f_a \ldots {}_k + \frac{1}{R}(f_a \ldots {}_k + f_{v.o.})\right)\right) \right) \ldots \right)$$

(4)

where $f_{out}$ is any one of discrete output frequencies within a selected range; R is the radix of the chosen numeral system, $f_a \ldots {}_k$ represents any one of R number of consecutive harmonic frequencies in a set bounded by frequencies defined in Expressions 2 and 3; and $f_{v.o.}$ is a chosen digitally-represented frequency from the variable oscillator, which is variable between the two consecutive harmonics M and $M+1$.

The digital relation of the invention may be shown by expanding Expression 4 to provide the following digital series:

$$N = R^m S_a \ldots {}_x + \ldots R^2 S_a \ldots {}_x + R S_a \ldots {}_x + S_a \ldots {}_x$$
$$+ \frac{S_a \ldots {}_x}{R} + \frac{S_a \ldots {}_x}{R^2} + \ldots + \frac{S_a \ldots {}_x}{R^{(k-1)}} + \frac{(S_a \ldots {}_x + V)}{R^k}$$

(5)

where N is a number suitable for digital representation, R is the radix, $S_a \ldots {}_x$ is any one of the basic digits in the number system having the radix R, $m$ and $k$ are opposite limiting integer powers in the series, and V is a number that is digitally chosen from a continuously varying sequence which varies over the range between two consecutive digits of the chosen number system.

It is the last term in Expression 5 that determines the smallest variation (resolution) of number N.

The invention includes a "source unit," one or more "digital units," and a variable oscillator. The "source unit" generates the standard frequency and the chosen set of harmonics as defined by Expressions 2 and 3 above. Each "digital unit" is connected to receive the set of harmonics provided from the source unit, and may have a knob and dial to select, at one time, one harmonic from the set.

A directly readable dial system in the digits of the chosen number system may be used with the component digital units and variable oscillator unit to synthesize any frequency in the selected frequency range.

The variable frequency oscillator selects a frequency within the range of $f_M$ to $f_{(M+1)}$; and has a dial that digitally indicates its frequency setting in the digits of the chosen number system.

The variable oscillator provides the lowest order digits in the output frequency. The maximum number of digits that it provides is determined by the indication accuracy of the variable oscillator frequency. For example, if its output frequency indication can be accurately resolved to four digits in the chosen number system, the variable oscillator can provide the four lowest digits in the synthesized output frequency of the system. Each digital component unit provides one of the higher order digits of the output frequency in terms of the chosen number system, and also increases the stability of the variable oscillator component in the output frequency of the system.

A first digital unit has a mixer circuit that receives the output of the variable frequency oscillator and also receives, according to the unit's dial setting, a selected one of the harmonics from the group of $f_a \ldots k$. A filter selects the first order summed output of the mixer, and a frequency divider scales (divides) the summed output by the given radix to provide the output of the first digital unit.

A second digital unit, if one is used, may be identical to the first digital unit. The second unit, however, receives the output of the first unit as a mixer input instead of the variable oscillator input provided to the first digital unit. Similarly, third, fourth, etc. digital units may be connected to the system to provide more digits for the synthesized output frequency; where each added unit may be identical to the first unit, and each receives the output of its prior unit as one mixer input. Its other mixer input is a selected one of the harmonic set, $f_a \ldots k$, as determined by a switch setting.

The stability of the variable oscillator component in the output frequency of the system increases directly with the number of times that it is scaled before it becomes a component of the output frequency of the system. This scaling factor is determined by the number of dividing type of digital components used and by the dividing factor of each. Hence, the stability of the variable oscillator component in the output frequency may be defined by the following expression:

$$T = \frac{DS}{R^k} \quad (6)$$

where T is the stability in cycles-per-second of the variable oscillator component in output frequency of the synthesizer; S is the actual stability of the variable oscillator in parts-per-million; D is the highest frequency of the variable oscillator in megacycles; R is the radix of the chosen number system; and $k$ is the number of dividing type of digital units.

The actual stability of the ultimate output frequency of the system is determined by the lesser stable of either (1) the stability of the standard frequency, or (2) the stability of the variable oscillator component in the synthesized output frequency. The variable oscillator component can easily be made to exceed the stability of a crystal oscillator by providing sufficient scaling with a sufficient number of dividing digital units. However, the variation of the output frequency of the system due to the variable oscillator decreases accordingly. As a practical matter, maximum stability for the synthesized output is obtained when stability of the variable oscillator component becomes approximately equal to the stability of the standard frequency. Consequently, the minimum number of dividing digital units that will obtain maximum stability may be determined with Expression 6 above by substituting the standard frequency stability for T and solving for $k$, using the parameters of the chosen variable oscillator. The nearest integer value of $k$ is the minimum number of dividing digital units.

Another element that often enters into the stability of the output frequency of the system is the phase stability of the frequency dividers and other elements used in the units comprising the system. Thus, proper design of the digital units requires a selection of elements that have maximum phase stability.

Further objects, features and advantages of this invention will be apparent to a man skilled in this art after thorough study of this specification and drawings; in which, Figure 1 is an illustrative embodiment of a decade form of the invention; and, Figure 2 represents a generic form of the invention.

Now referring to a decade form of the invention in more detail, Figure 1 shows a source unit H, which includes a crystal 10 that controls an oscillator 11. A harmonic generator 12 receives the output of oscillator 11 and generates a set of harmonics $f_9$ through $f_{18}$.

In the embodiment of Figure 1, M is one and $t$ is zero in Expression 1 above. The factor $R^t$ comprehends multiplication of the synthesized output, and no multiplication occurs when only dividing type units are used, in which case $R^t$ is one. The choice of M controls the output frequency range and the choice of harmonic frequencies in the system. Then in Figure 1, the harmonic set defined by Expressions 2 and 3 includes the harmonics $f_9$ through $f_{18}$. Crystal 10 provides the standard frequency in Figure 1 and resonates at an exemplary fundamental frequency of 100 kilocycles-per-second, which is frequency $f_1$ and is the fifth power of the radix in cycles-per-second.

Accordingly, the ten harmonics, $f_9$ through $f_{18}$, range in frequency from 900 to 1800 kilocycles-per-second, inclusive. The ten harmonics are connected separately to individual and isolated leads, which, for simplicity in the drawings, are represented by a single line 13. Thus, the individual leads represented by line 13 are shielded from each other to prevent mutual coupling.

Many well known oscillators and harmonic generators are available to satisfy the requirements of unit H. The output harmonics are preferably equalized in amplitude at the output of generator H, although equalization is not essential to operation of this invention.

A variable oscillator 14 is provided which varies in frequency from 100 to 200 kilocycles-per-second. Thus, variable oscillator 14 satisfies the requirement stated above, because it varies between $f_M$ and $f_{(M+1)}$, and M was chosen to be one in Figure 1. Oscillator 14 is the so called straight-line type where its frequency varies linearly with rotation of its control shaft. This is used for its dial indicating system, which is further explained below.

It is assumed that variable oscillator 14 has a long term stability of 500 cycles-per-second variation per one-million cycles-per-second of oscillator frequency. This can be readily obtained in practice.

A plurality of digital units A, B and C are provided, and each is connected to the output of source unit H by means of respective leads 13.

Digital units A, B and C are identical and are classified as dividing digital units, because each contains a frequency divider.

Similar items in the respective digital units will be designated by the same reference numeral, but will also have a reference letter which specifies only one of the digital units.

Each digital unit has a single-pole ten-throw switch 24. Thus, first digital unit A has switch 24a with ten contact terminals connected respectively to the leads 13 carrying harmonics $f_9$ through $f_{18}$. Similarly, the switches in units B and C also are connected to harmonics $f_9$ through $f_{18}$, respectively. The respective connections are indicated by braces in Figure 1 to prevent undue complication in the drawings.

Each digital unit has a mixer 26 that receives two inputs. The first mixer input to each digital unit is connected to the pole 28 of the unit's switch 24 to receive a selected one of the frequencies $f_9$ through $f_{18}$. The second input to mixer 26a of first digital unit A is connected to the output of variable oscillator 14 by a lead 27. The second mixer input of the mixer in each following digital unit is connected to the output of its prior unit. Accordingly, the second input to mixer 26b connects to the output of unit A; and the second mixer input to mixer 26c of third unit C connects to the output of second unit B.

A filter 31 connects to the output of mixer 26 and selects the frequency, which is the sum of the two mixer input frequencies. Hence, one mixer input, which is a selected harmonic frequency, will range from 900 to 1800 kilocycles-per-second; and the second input frequency for each mixer varies from 100 to 200 kilocycles-per-second. Hence, the output frequency selected by filter 31 will vary from 1000 to 2000 kilocycles-per-second depending upon the setting of its switch 24 and the output frequency of the prior unit, which is variable oscillator 14 for digital unit A. Consequently, the minimum order spurious frequency output of mixer 26 will be sixth order, since the minimum mixing ratio is five-to-one. Consequently, there are no stringent requirements on filter 31 since the minimum spacing between first order mixer components is 100 kilocycles-per-second in Figure 1. Accordingly, no balanced mixer is required here, although it may be used if desired.

A frequency divider 32 is connected to the output of filter 31 and divides the summed frequency by the radix of the number system, which is ten in Figure 1. If necessary, the output of divider 32 is passed through another filter 33, since some types of dividers provide pulsed outputs that are rich in harmonic content which must be attenuated. Filter 33 may be part of divider 32, as occurs when divider 32 is of the regenerative type.

Variable frequency oscillator 14 is of the so-called straight-line-frequency type, wherein its frequency varies linearly from 100 to 200 kilocycles with rotational variation of its control shaft 34. A knob 36 is fixed to control shaft 34 and a dial 37 cooperates with knob 36 and indicates the ten basic digits 0-9 of the decade system.

A second knob 38 is connected to oscillator shaft 34 through a gear transmission 39 having a ten-to-one gear ratio, wherein second knob 38 rotates ten times as much as first knob 36. Second knob 38 cooperates with a dial 41 that also indicates the basic decade digits 0-9. Second knob 38 moves ten digits when first knob 36 moves one digit.

In a like manner, a third knob 42 may be coupled to second knob 38 through a similar transmission 43 having a ten-to-one gear ratio; and third knob 42 cooperates with a similar dial 44. Accordingly, third knob 42 rotates ten units for one unit of rotation by second knob 38 and rotates ten revolutions, one 100 units, for one unit of rotation by first knob 36. As a result, the settings of the three knobs 36, 38 and 42 can indicate to three digits in a decade manner the setting of variable oscillator 14 between 100 and 200 kilocycles.

Further knobs with ten-to-one transmissions can be provided. However, a practical limit arises when the finest indication, provided by the last knob, no longer is accurate, which may be caused by backlash in the gears of the transmissions or may be caused by small deviations from linearity in the straight-line-frequency characteristic of the oscillator.

The frequency variation of variable oscillator 14 will not, per se, be in the synthesized output of the system; however, its digital effect on the output will be the same as that indicated by its dials 37, 41 and 44 to provide the last digits for the synthesized output frequency. Thus, the digital point is changed with respect to the variable oscillator frequency when it, in effect, appears in the synthesized output.

Another knob 46 cooperates with each digital unit, and it is connected by a shaft 47 to its respective switch pole 28. A dial 48 cooperates with knob 46 and has the basic digits 0-9 indicated. Consequently, the setting of a respective knob 46 to one of the digits 0-9 causes its coupled switch pole 28 to select one of the harmonic frequencies $f_9$ through $f_{18}$ for mixer 26.

However, the tuned frequencies of filters 31 and 33 in the digital units are not solely determined by the frequencies of the selected harmonics, but are controlled by the sum of its selected harmonic and the incoming frequency from the prior unit. Accordingly, the ten positions of any knob 46 will not provide sufficient information for exact tuning by its filters 31 and 33. Nevertheless, these ten positions may provide ten compromise-tuned frequencies which may be sufficient in some cases.

In order to obtain exact tuning for filters 31 and 33, it is necessary to provide (1) information from the settings of all prior units which together provide the second mixer input, and (2) the setting of knob 46 which selects the first mixer input for the respective unit.

A differential transmission 51 is provided to obtain and combine these two sources of information in a manner which can provide precise tuning for filters 31 and 33.

Each differential transmission 51 does mechanically what its digital unit does electrically. It receives two inputs, one being the divided output of the prior unit, and the other being the selected setting of the respective unit; and its output is the sum of the two inputs. The differential transmission has an output shaft 52 which is rotationally related to its input shafts 53 and 54 by the following formula:

$$D = K + \frac{1}{10}(P) \qquad (7)$$

where D is the angle of rotation for the differential output shaft 52; K is the angle of rotation for input shaft 53 provided by knob 46; and P is the angle of rotation provided by the other input shaft 54, which is the output shaft of the prior mechanical unit. Input shaft 54a of first differential 51a is connected to variable oscillator control shaft 34.

Output shaft 52 connects to filters 31 and 33, which track together since they always have a ten-to-one frequency ratio in the decade system of Figure 1.

Accordingly, the output shaft of each differential transmission 51 provides the combined information of the knob setting of its unit and of the knob settings of all previous units, to precisely tune its filter 31 and 33.

A dial 56 with a fixed knob 57 is provided, which points to the digit one, which is the value of M chosen for the design of the example in Figure 1 (see Expressions 1, 2 and 3 above. Thus, knob 56 will point to whatever number represents M. If M is chosen to be greater than nine, then more than one dial will be needed to present it digitally in the decade system.

The synthesized output frequency in Figure 1 is directly indicated in cycles-per-second by dials 56, 48c, 48b, 48a, 37, 41 and 44 and decimal point 58. The position of decimal point 58 is determined by the frequency range of the variable oscillator, its number of dial indications, and the number of dividing digital units in the system.

In order to determine the number of dividing type units that should be used to obtain a required degree of stability for the output frequency of the system, Expression 6 above may be solved for the number of dividing type of units to provide the following:

$$k = \log_R\left(\frac{DS}{T_0}\right) \qquad (8)$$

Here, $T_0$ is the desired stability of the system output frequency, and it may be any value not exceeding the stability of the standard frequency $f_1$. The value of $k$ provided by Expression 7 must be rounded off to the nearest integer, since the number of dividing digital units must be an integer. The exact stability may then be obtained by using this value of $k$ in Expression 6 above.

Thus, it may be assumed in a practical case that $S$ is 500 cycles-per-second variation per million cycles-per-second of frequency, $R$ is 10, and $T_0$ is one cycle-per-second variation in ten million cycles-per-second of frequency which may be the stability of crystal oscillator 11, and $D$ is 0.2 megacycle-per-second which is the maximum frequency for oscillator 14 in this example. Then, $k$ equals 3 dividing digital units, as shown in Figure 1.

It is generally impractical to extend the number of digits beyond that number which comprehends the maximum stability of the system. Thus, in Figure 1, a digital reading is provided, which is 165191.2 cycles-per-second. This provides a reading with increments of one-tenth cycle-per-second over a range from 100 to 200 kilocycles-per-second, or 1,000,000 different frequencies.

Consequently, the smallest incremental variation in Figure 1 is close to the same order of stability as crystal oscillator 10, which may be about one cycle-per-second in $10^7$ cycles-per-second.

In order to obtain the same digital representation in a system comprised solely of digital units, as taught in the above cited patent application, six dividing digital units, each similar to digital unit B, would be required. This is twice the number required to provide substantially equal performance when the present invention is used. The present invention, in effect, substitutes a single variable oscillator in Figure 1 for an additional three dividing digital units to obtain similar performance. Thus, it is apparent that this invention greatly simplifies the number of components required to obtain a digital indication of a given accuracy and stability, and reduces the overall size of the equipment.

Figure 2 illustrates a generic form of the invention. It also includes a source unit H which generates a standard frequency $f_1$ and a set of harmonics $f_a \ldots _k$. It is, of course, possible to generate fundamental frequency $f_1$ from any of its multiples and divisibles, as explained above.

The units used in Figure 2 are a variable oscillator 66, a first digital dividing unit A, followed by any number of similar dividing units, generically represented as unit X, and a neutral digital unit P. Neutral digital unit P differs basically from the dividing digital units in that the former does not have a frequency divider. After a minimum of one, as many dividing digital units may be used theoretically as is required; and each added dividing unit adds a digit to the system that decreases the synthesized output frequency increment by another digit. But practically, a limitation occurs when the stability of the variable oscillator component in the synthesized frequency equals the stability of the crystal oscillator components.

Source unit H provides the set of harmonic frequencies $f_a \ldots _k$, also represented as $f_a \ldots _k$, that are selected according to Expressions 2 and 3 above, where M is one or a larger integer. The variable oscillator in Figure 1 varies over a range of frequencies defined by the following expression:

$$\text{Range}_{v.o.} = R^z M \text{ to } R^z (M+1) \quad (9)$$

where $R^z$ is the standard frequency.

Each digital unit has a single-pole multi-contact switch 67 wherein the number of contacts are equal to the radix of the chosen number system. Thus, two contacts will be used in the binary system, three in the ternary system, and ten in the decade system, etc.

The number of contacts will also equal the number of harmonic frequencies in the set $f_a \ldots _k$ generated by unit H; and a plurality of leads, represented by line 68, will respectively connect the harmonics to the contacts in the order shown in Figure 2. Each digital unit has a mixer 69 that has one input connected to the pole of its switch 67, and that has its second input connected to the output of the previous unit. Accordingly, the second mixer input to mixer 69a in first digital unit A is connected to the output of the variable frequency oscillator 66. A filter 71 is provided in each digital unit, and it is connected to the output of mixer 69 in the unit and selects the frequency which is the sum of the two mixer input frequencies.

Each of the dividing digital units A through X has a frequency divider 72 that receives the output of filter 71 and divides it by the radix of the chosen number system. A second filter 73 may be provided in each dividing digital unit to filter the output of the divider and remove spurious harmonic components, permitting only the basic divided frequency to pass.

A system of dials 75 through 79 and knobs 81 through 85 is provided in Figure 2 in a manner similar to Figure 1. Each dial is calibrated with the basic numbers of the selected digital system. For example, in a binary system, dials will only have the digits 0–1. In a ternary system they will have the digits 0, 1 and 2, etc., while the decade system will have the digits 0 through 9.

A differential system interconnecting the knobs may be also provided in Figure 2 to obtain exact tuning for filters 71 and 73 and, if needed, dividers 72 as was done in Figure 1. In such case, the transmission ratio for each differential transmission unit (not shown in Figure 2) is defined by the formula:

$$D = K + \frac{1}{R}(P) \quad (10)$$

wherein R is the radix of the chosen number system, and the other symbols are as defined for Formula 7 above.

A digital indication of the variable oscillator setting is obtained by any number of knobs such as 83, 84 and 85 that are interconnected by respective transmissions 87 and 88 each having a transmission ratio of R to one.

In Figure 2, the filters 71 and 73 are compromise tuned, because the information from the settings of prior units is not provided.

Another type of unit (not shown) which may be added to receive the output of neutral unit P is a multiplying digital unit. It is like a dividing digital unit, except that it has a multiplier substituted for the frequency divider; and the multiplier unit multiplies by consecutively increasing powers of the radix for a consecutive increase in digits, where these digits increase the frequency range. They are explained in detail in the above cited patent application. The stability of the output decreases by the factor of multiplication. Thus, it is primarily the number of divider type digital units which determines the stability of the variable oscillator component in the output frequency of the system.

It is apparent to a man skilled in the art, who has thoroughly studied the above disclosure, that numerous and widely differing embodiments are comprehended by the teachings of this disclosure and can be constructed without departing from the scope of the invention. It is, therefore, intended that all material contained in the above description and shown in the accompanying drawings, should be interpreted in an illustrative sense, and not in a limiting sense, which is done in the following claims.

What is claimed is:

1. A variable frequency synthesizer comprising a frequency source generating a frequency of $R^z$ cycles per unit of time, where R is the radix of a chosen number system, and z is a chosen integer, harmonic generating means for generating from said source frequency a set of R number of consecutive harmonics between the limits $M(R-1)$ and $(M+1)(R-1)$, where M also is a chosen integer, a variable oscillator providing an output with a frequency that extends between the harmonics M and $(M+1)$ of the source frequency; a plurality of dividing digital units, each including a switch having a single pole, and at least R number of contacts respectively receiving said consecutive harmonics of said harmonic generating means, a mixer having a pair of inputs with one input connected to its pole and having an output, filter means connected to the mixer output for selecting its first-order summed output and having an output, and a frequency divider for dividing the filter output by the radix R; the first of said dividing digital units having its other mixer input connected to the output of said variable oscillator, each of the other of said dividing digital units having its other mixer input connected to the divided output of the adjacent prior one of said dividing digital units, first means for controlling and indicating the frequency setting of said variable oscillator in the digits of the chosen number system except for its highest order digit, a plurality of differential transmission means each having first and second inputs, each differential transmission means having an output that is the sum of its two inputs, with the first input including a rotational division by R, one of said differential transmission means being associated with a respective one of said dividing digital units, the first input to the first differential transmission means connected rotationally to said first means, a plurality of second means for controlling and indicating the settings of the respective digital dividing units, each of said second means respectively calibrated in the basic digits of the chosen number system; the output of each of said differential transmission means being connected to the filter means of its associated dividing digital unit, each of said second means connected respectively to the second input of a different one of said differential transmission means and also connected to the pole of the switch in its associated digital dividing unit, with the first input of each differential transmission means except the first connected to the output of the prior differential transmission means.

2. A variable frequency synthesizer comprising a frequency source generating a frequency of $10^z$ cycles per second, where $z$ is a chosen integer, harmonic generating means for generating from said frequency source a set of ten consecutive harmonics between the limits $9M$ and $9(M+1)$, where $M$ also is an integer, a variable oscillator providing a frequency output that extends between the harmonics $M$ and $M+1$ of the source frequency; a plurality of dividing digital units, each including a switch having at least a single pole and ten contacts respectively receiving said consecutive harmonics, a mixer having an output and a pair of inputs with one input connected to its pole, filter means connected to the mixer output for selecting its first-order summed output and having an output, and a frequency divider for dividing the filter output by ten, the first of said dividing digital units having its other mixer input connected to the output of said variable oscillator, each of the other of said dividing digital units having its other mixer input connected to the divided output of the adjacent prior dividing digital unit, first means for controlling and indicating the frequency setting of said variable oscillator in the digits of the chosen number system except for its highest order digit, a plurality of differential transmission means each having first and second inputs, each differential transmission means having an output that is the sum of its two inputs, with the first input including a rotational division by ten, each of said differential transmission means being associated with a respective one of said dividing digital units, the first input to the first differential transmission means connected rotationally to said first means, a plurality of second means for controlling and indicating the settings of the respective digital dividing units, each of said second means respectively calibrated with the digits zero through nine, an output of each of said differential transmission means being connected to the filter means of its associated dividing digital unit, each of said second means connected respectively to the second input of a different one of said differential transmission means and also connected to the pole of the switch in its associated digital dividing unit, with the first input of each differential transmission means except the first connected to the output of the prior differential transmission means.

3. A variable frequency synthesizer comprising a frequency source generating a frequency $10^z$ cycles per unit of time, where $z$ is an integer, a harmonic generator that generates the ninth through eighteenth harmonics of said source frequency, a variable oscillator which generates an output with a frequency range between two consecutive harmonics of said source frequency, said consecutive harmonics being $M$ and $M+1$, where $M$ is an integer; a digital dividing unit including a switch having a single pole and ten contacts, with said contacts respectively connected to the ninth through eighteenth harmonics consecutively, a mixer with an output and having one input connected to said pole and a second input connected to the output of said variable oscillator, filter means connected to the output of said mixer to select its first-order summed output and having an output, a frequency divider connected to the output of said filter to divide its output frequency by ten, a rotatable input shaft to enable tuning of said vairable oscillator, first decade indicating means coupled to said shaft to indicate the digits of the variable oscillator output frequency, a differential transmission having first and second inputs with one input rotationally divided by ten, with said one input connected to said variable oscillator shaft, a second decade indicating means calibrated with the digits zero through nine coupled to the second input of said differential transmission and also coupled to the pole of said dividing digital unit, an output of said differential transmission coupled to the filter means in said dividing digital unit to enable precise tuning.

References Cited in the file of this patent

UNITED STATES PATENTS

| | | |
|---|---|---|
| 2,581,594 | MacSorley | Jan. 8, 1952 |
| 2,648,006 | Mabry | Aug. 4, 1953 |
| 2,745,962 | Wojciechowski | May 15, 1956 |

FOREIGN PATENTS

| | | |
|---|---|---|
| 148,412 | Australia | Sept. 29, 1952 |